I. HUPP.
TRANSMISSION MECHANISM.
APPLICATION FILED MAR. 17, 1917. RENEWED JULY 21, 1919.

1,338,303. Patented Apr. 27, 1920.
5 SHEETS—SHEET 1.

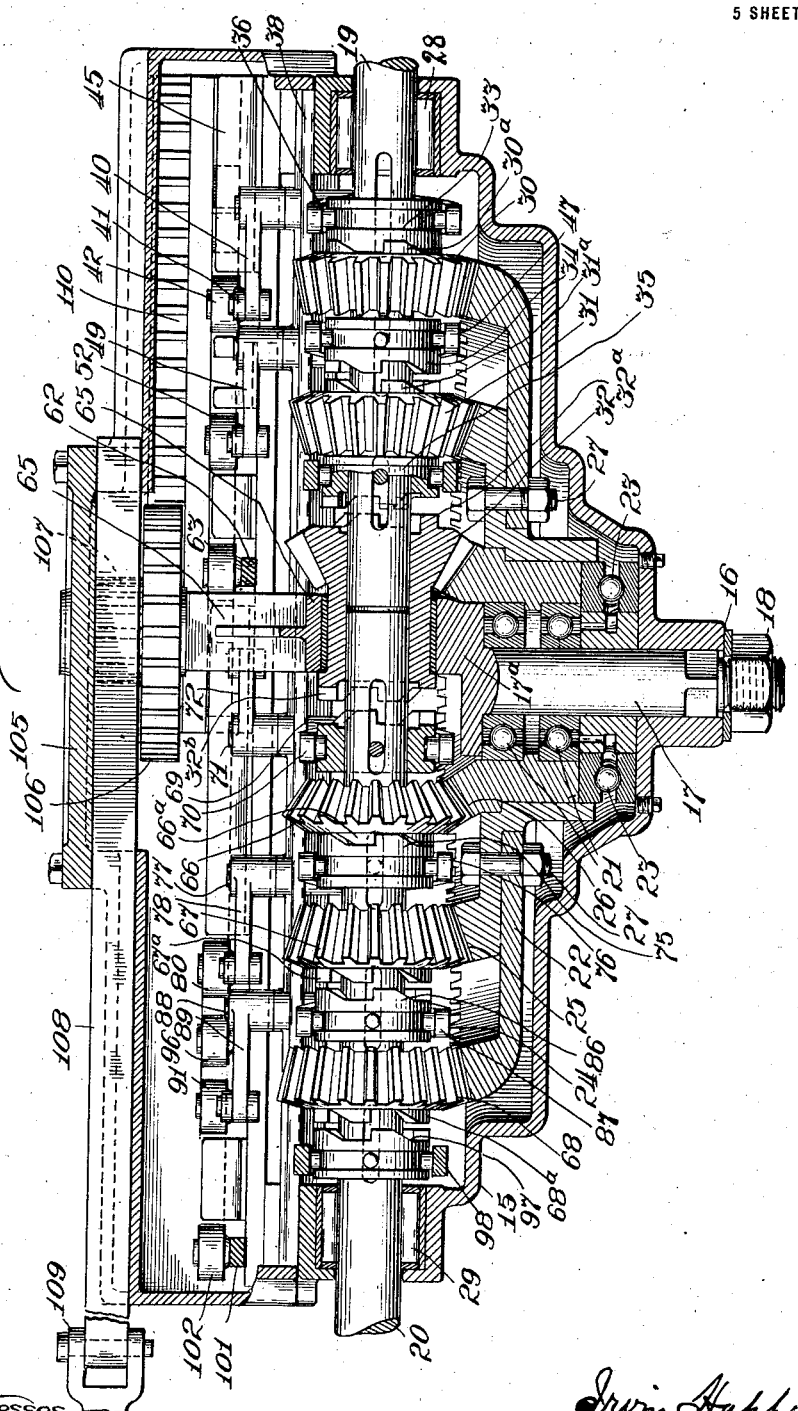

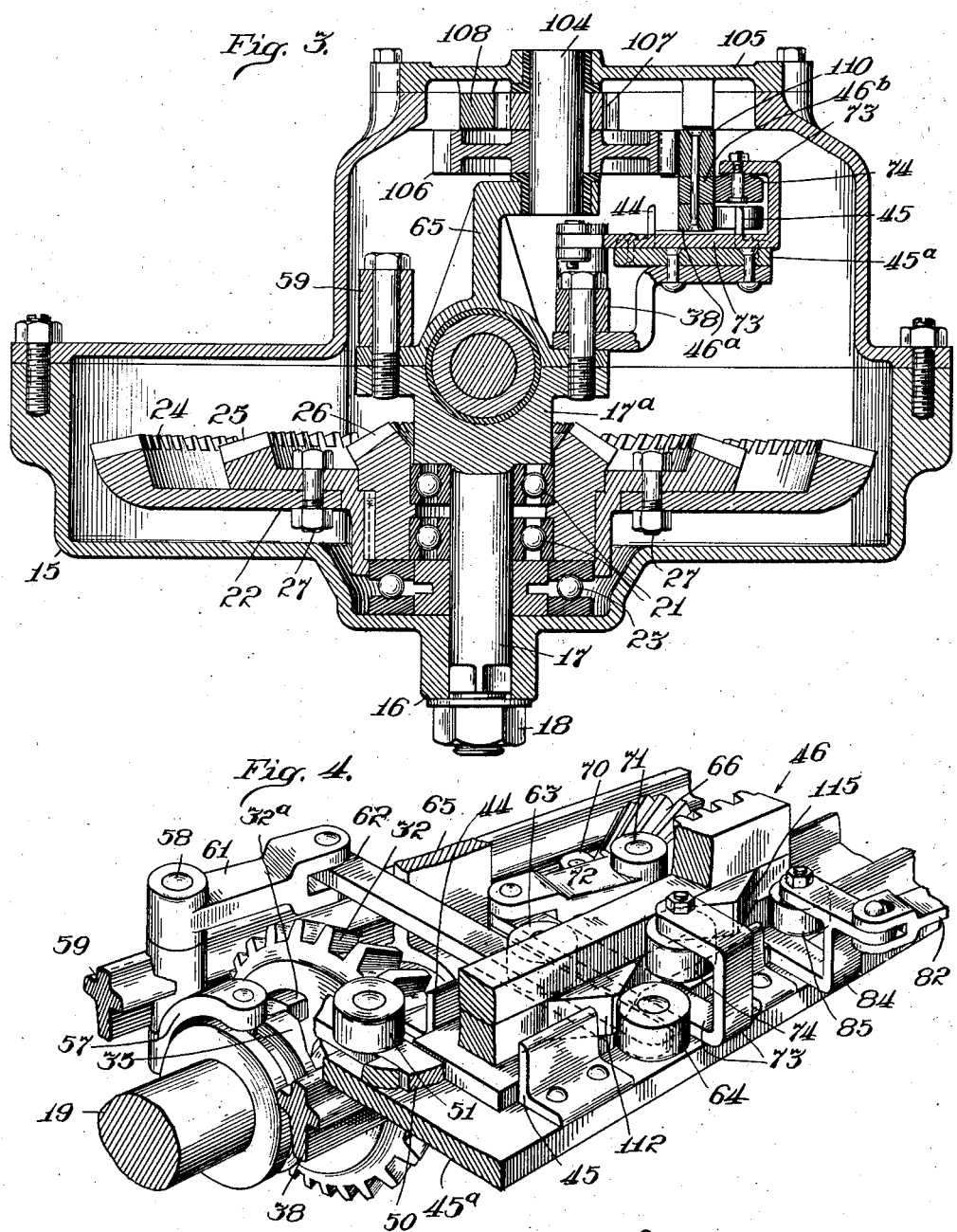

I. HUPP.
TRANSMISSION MECHANISM.
APPLICATION FILED MAR. 17, 1917. RENEWED JULY 21, 1919.
1,338,303.
Patented Apr. 27, 1920.
5 SHEETS—SHEET 4.
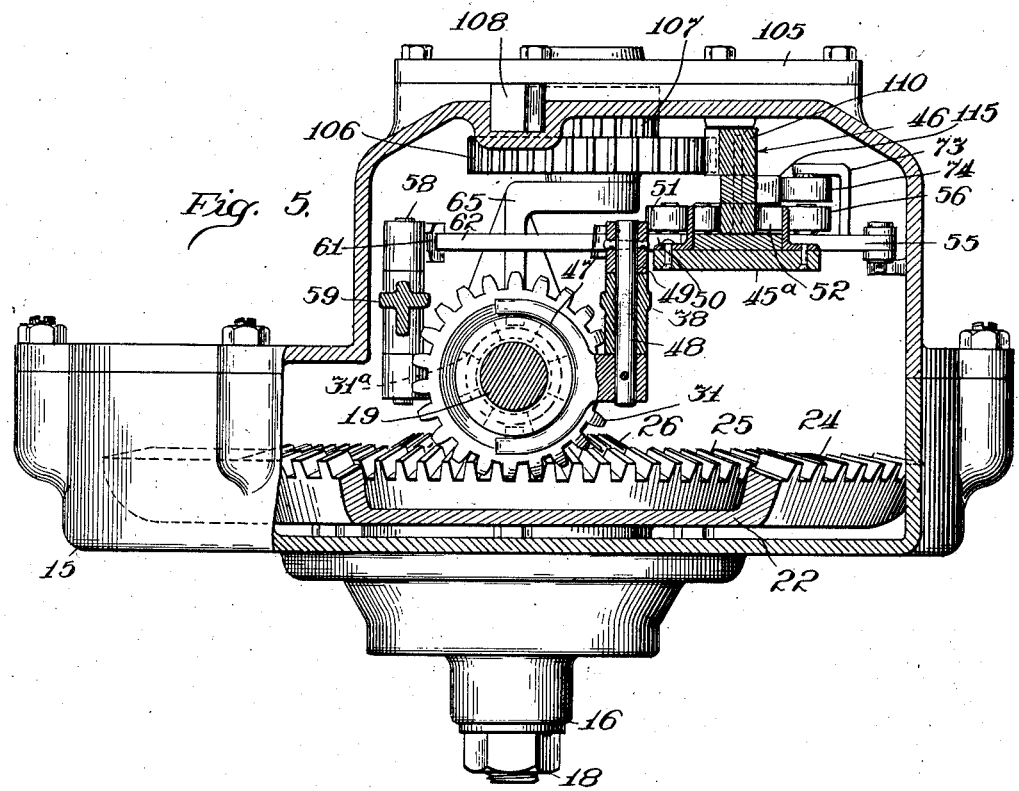
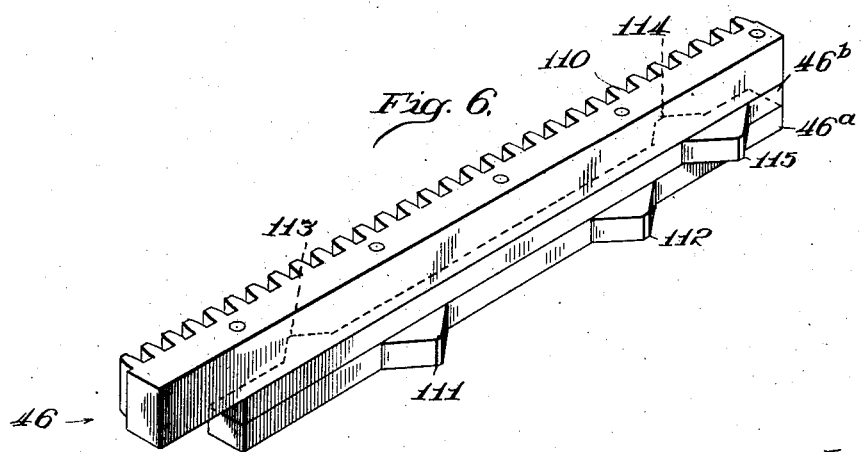

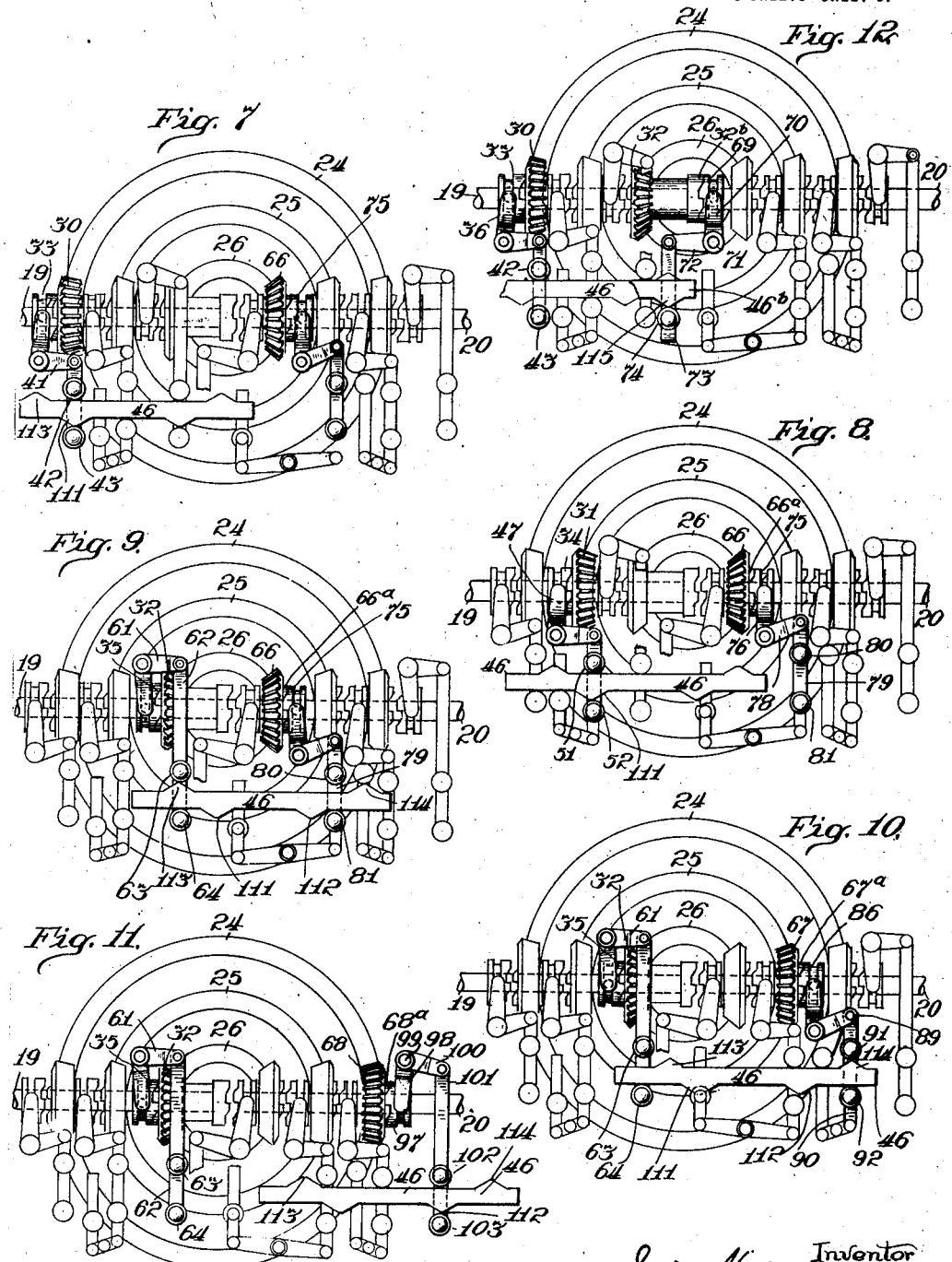

UNITED STATES PATENT OFFICE.

IRVIN HUPP, OF CHICAGO, ILLINOIS, ASSIGNOR TO FLEXO MOTIVE CORPORATION, A CORPORATION OF DELAWARE.

TRANSMISSION MECHANISM.

1,338,303.      Specification of Letters Patent.      Patented Apr. 27, 1920.

Application filed March 17, 1917, Serial No. 155,572. Renewed July 21, 1919. Serial No. 312,271.

*To all whom it may concern:*

Be it known that I, IRVIN HUPP, a citizen of the United States, and a resident of Chicago, in the county of Cook and State of Illinois, have invented a certain new and useful Improvement in Transmission Mechanism, of which the following is a description, reference being had to the accompanying drawings, which form a part of my specification.

My invention relates to transmission mechanism, especially applicable for use in connection with automobiles and the like; and has for its object the provision of a bevel gear transmission whereby a plurality of speeds may be obtained and the change of speeds or ratios effected without the necessity of shifting the gears.

My invention also contemplates a construction wherein the change of speeds is produced by the shifting or reciprocating movement of a suitable member or cam-rod adapted to actuate a series of independently operable elements for successively operating clutch mechanisms whereby the desired ratio or speed is obtained; the clutch mechanisms being adapted to effect operative relation between the selective gears and the power shaft and driven shaft, respectively.

A further object of my invention is to provide a transmission whereby all speeds forward and reverse are effected through a single operating member or lever so connected with the means whereby the clutch mechanisms are controlled that the latter will be actuated at a much greater speed than that of said lever and thus enable the changes in speed to be quickly obtained.

Another object of my invention is to provide a construction wherein it is made impossible to actuate or throw more than one clutch into engagement at a time, thus eliminating the possibility of locking the transmission or "stalling" the motor.

The invention contemplates a construction wherein a neutral position is obtained between each ratio or speed change; and wherein the power is imparted from the driving or power shaft to a second or driven shaft by means of an improved bevel gear construction which contemplates, in the specific conception disclosed, the employment of a plurality of clutches arranged on both of said shafts so as to successively bring the respective portions of the gearing into operative relation with the shafts and thereby transmit the power from the power or driving shaft in the desired direction and at the desired speed.

It is evident from the construction shown and hereinafter to be described, that any speed reduction required from the power shaft to the driven shaft may be obtained by the employment of suitable sized gears and pinions. The transmission mechanism is all arranged within a suitable housing of such formation and construction as to enable the intermeshing elements to be immersed in oil, and yet at the same time provide a housing which will enable the respective parts to be readily accessible.

The foregoing enumerated purposes and advantages will be more fully comprehended from the following detailed description of the accompanying drawings, wherein:—

Fig. 2 is a longitudinal sectional view, taken on the line 2—2 of Fig. 1 looking in the direction of the arrows.

Fig. 3 is a cross sectional view taken on the line 3—3 of Fig. 1 looking in the direction of the arrows.

Fig. 4 is a cross sectional view taken on the line 4—4 of Fig. 1 looking in the direction of the arrows.

Fig. 5 is a cross sectional view taken on the off-set line 5—5 of Fig. 1 looking in the direction of the arrows.

Fig. 6 is a detail perspective view of a portion of the clutch-mechanism and operating means.

Fig. 7 is a diagrammatic view illustrating in heavy lines the respective elements and positions obtained in effecting what may be termed the first speed or first ratio.

Fig. 8 is a similar view illustrating the elements shifted to a second position or speed ratio, obtained in the shifting of the actuating mechanism from left to right of the transmission as illustrated in Fig. 1.

Fig. 9 is a diagrammatic view illustrating the elements shifted to a third position or speed ratio.

Fig. 10 is a similar view showing the fourth position or speed ratio obtainable by the continued shifting of the actuating mechanism from left to right as disclosed in Fig. 1.

Fig. 11 is a similar view illustrating the fifth position or speed ratio, obtainable by continued movement of the actuating mechanism from left to right in Fig. 1.

Fig. 12 is a diagrammatic view illustrating in heavy lines the operative position of those elements actuated when the transmission has been shifted into a reversing relation.

Figure 1:
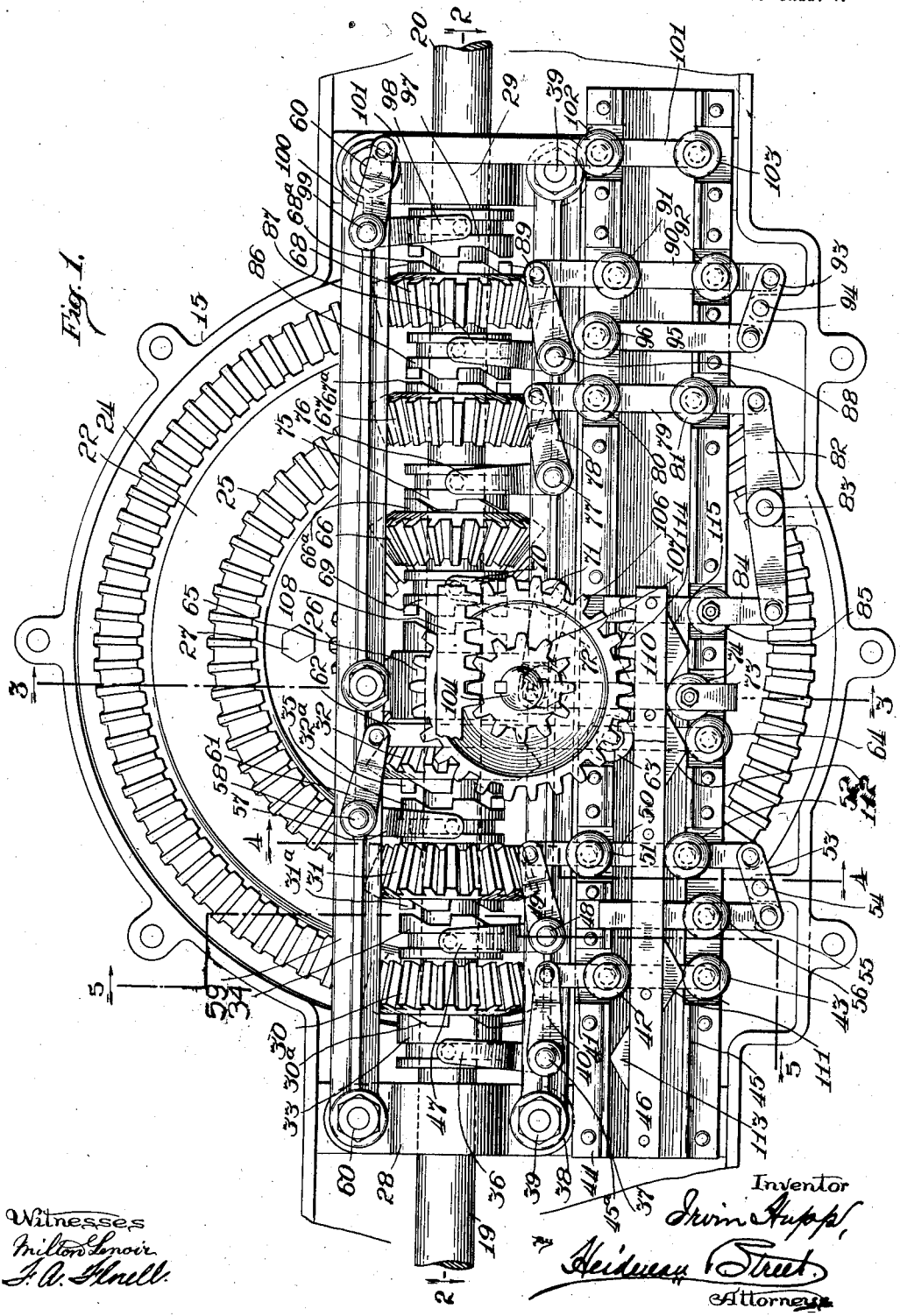
Figure 1 is a plan view of the transmission, with the upper portion of the housing or cover removed and a portion of the operating member or lever shown broken away.

In the particular exemplification of the invention as illustrated in the drawings, 15 designates a housing composed of suitable metal such as aluminum and the like, and made of a sufficient depth to permit of the introduction of a quantity of oil whereby the intermeshing gearing and clutch mechanisms may be completely immersed. The housing is shown as preferably having a boss or hub-formation 16 adapted to provide a suitable bearing for the shaft or trunnion 17 which is held in place for example by means of the nut 18. The upper end of the trunnion 17 is flared, as shown in Fig. 3, to provide the bearing or pillow 17ª, which provides support for the inner ends of a power shaft 19 and driven shaft 20, as more clearly shown in Fig. 2. The portion of the trunnion or shaft 17 intermediate of the pillow-portion 17ª and the boss 16 of the housing, is provided with a suitable number of ball race-ways or bearings 21 fitting about the shaft intermediate of the trunnion or shaft 17 and the inner perimeter of a large composite gear 22, so as to provide suitable anti-friction bearing for the composite gear on the trunnion or shaft and enabling the gearing to freely rotate about the trunnion. Intermediate of the bottom portion of the housing and the inner or hub-portion of the composite gearing, I prefer to provide suitable ball race-ways or bearings 23 adapted to take the downward or end thrust that may be imparted to the composite gearing 22. The two race-ways 21, shown, are preferably arranged in spaced relation by a lug on the inner perimeter of composite gear; while the race-way 23 is so arranged as to bring the ball-bearings immediately beneath the hub of composite gear 22; and the race-ways for the bearings 21 and 23 are so arranged as to provide communicating passages for the admission of oil, as is very clearly shown in Fig. 2.

The composite gearing 22 in the embodiment of the invention, as disclosed in the drawings, is composed of the concentrically arranged circumferentially bevel gears 24, 25 and 26 provided with flange and hub-portions which enable them to be secured together as for example by means of bolts 27, so that the respective portions 24, 25 and 26 of the composite gearing will be made to rotate together.

The outer perimeter of the housing 15, at diametrically opposite points, is formed to provide suitable pockets or race-ways for anti-friction bearings, such as roller bearings, for the power shaft and the driven shaft, as illustrated at 28 and 29, respectively, in Fig. 2.

Loosely mounted on the power shaft 19 are a plurality of beveled pinions 30, 31 and 32 preferably all of the same diameter having the same number of teeth and arranged at spaced intervals apart so as to be in constant mesh with the respective portions of the composite gear 22; that is pinion 30 is arranged in mesh with large gear 24; pinion 31 in mesh with large gear 25 and pinion 32 in mesh with gear 26. The rear or back faces of the pinions are provided with clutch teeth or clutch surfaces as shown at 30ª 31ª and 32ª respectively.

Slidably keyed on the power shaft 19, by means of slot and pin connection and intermediate of the bearing 28 and pinion 30, is a clutch member 33 adapted to have interlocking or clutching engagement with the clutch surface 30ª of pinion 30; and intermediate of pinion 30 and pinion 31 is a clutch member 34 slidably keyed to shaft 19 so as to be moved into interlocking or clutching engagement with the clutch surface 31ª of pinion 31; while intermediate of pinion 31 and pinion 32 is a clutch member 35 slidably keyed to shaft 19 so as to be moved into interlocking or clutching engagement with clutch surface 32ª of pinion 32.

The clutch member 33 is controlled by the yoke or bifurcated member 36, pivoted at 37 on a suitable frame or supporting member 38 arranged longitudinally of the transmission, as shown in Fig. 1, that is from the roller-bearing housing at one side of the transmission housing to the bearing-housing at the opposite side; the frame or supporting member 38 being bolted or otherwise secured in place as at 39 in Fig. 1. Secured to the pivot 37 of yoke or bifurcated member 36, so as to move therewith, is a lever 40, to the opposite or swinging end whereof is pivotally secured a link 41, on which, at predetermined points, are mounted rollers 42 and 43 adapted to rotate in a horizontal direction, see Figs. 1 and 2. The link 41 has sliding bearing in suitable cut portions or slots formed in the supporting members 44 and 45, formed in the nature of angle irons, see Fig. 1. The frame members or angle irons 44 and 45 are secured in spaced relation on a plate 45ª, see Fig. 5, so as to provide a suitable channel or slide-way for the reciprocation of a clutch-operating member or cam-rod 46 which is adapted to reciprocate lengthwise of the slide-way and therefore lengthwise of the shafts, The clutch member 34 is controlled by a bifurcated member or yoke 47 pivoted at 48 to supporting member 38. Secured to pivot 48 so as to actuate yoke 47, is a lever 49, whose free end is pivoted to a link 50 which extends transversely of supporting members 44 and 45 and in suitable slots or sockets formed therein so as to permit movement not only of link 50, but also of rollers 51 and 52 which are pivotally secured to link 50 so as to rotate in a horizontal direction. The outer end of link 50 is pivotally secured to a rocker bar 53 pivoted at 54 to the housing while the opposite end thereof is pivotally secured to a bar 55 on which is rotatively mounted a horizontally disposed roller 56; the free end of bar 55 having sliding bearing in a suitable slot in the frame member 44.

Clutch member 35, arranged intermediate of pinions 31 and 32, is controlled by the bifurcated member or yoke 57 pivoted at 58 to a supporting member 59, which, like member 38, extends lengthwise of the transmission housing and is bolted or otherwise secured at its ends to the roller bearing housings secured about the shafts 19 and 20, as shown in Fig. 1 at 60. Secured to the pivot 58, so as to cause yoke-member 57 to rock or oscillate is a lever 61 whose free end is pivotally connected to link 62 which extends across shaft 19 to the opposite side and through suitable slots in the supporting frame-members 44 and 45. The link 62 is provided with rollers 63 and 64 pivotally mounted thereon so as to revolve in a horizontal direction, and thus bring the bell-crank lever construction 57, 61 into operative relation with the operating member or cam-rod 46.

The pinions and clutch mechanism just described are all arranged on the power or driving shaft 19, with the pinions constantly in mesh with the large composite gear 22, but rotating freely on the power shaft 19 without transmitting motion from the latter to said composite gear except when the respective clutch mechanism has been placed into clutching engagement with the selective pinion. In Fig. 1, pinions 31 and 32 are merely idling on the power shaft, while power is transmitted from the power shaft 19 to composite gear 22 by means of pinion 30, which has been placed in operative relation with shaft 19 by means of clutch 33.

Pinion 32 is provided with an elongated hub, see Fig. 2, and has bearing in the pillow-portion 17$^a$ and the bracket-portion 65; the hub-portion of the pinion being slightly reduced to receive suitable bushing, as shown in Figs. 2 and 3, while the end of the hub terminates in an interlocking or clutch surface 32$^b$, see Figs. 1 and 2. The pinion 32 also provides bearing or support for the inner end of the driven shaft 20; it being understood, of course, that the latter rotates freely in the hub of the pinion.

Loosely mounted on the driven shaft 20, so as to normally idle thereon, are a plurality of bevel pinions 66, 67 and 68, preferably of the same size as pinions 30, 31 and 32; pinion 66 being constantly in mesh with gear-portion 26 of the composite gear 22; pinion 67 constantly in mesh with gear portion 25 of composite gear 22, while pinion 68 is constantly in mesh with large gear portion 24 of composite gear 22.

Slidably keyed to the driven shaft 20, at a point intermediate of the front face of pinion 66 and the clutch surface 32$^b$ on the hub of pinion 32, is a clutch 69 adapted to have interlocking or clutching engagement with clutch surface 32$^b$ of pinion 32 when it is desired to effect a direct driving or operative relation between power shaft 19 and driven shaft 20. Clutch 69 is controlled by means of the yoke 70 which is pivoted at 71 to the supporting member 38. Connected to the same pivot, so as to cause yoke 70 to oscillate therewith, is a lever 72, shown in dotted lines in Fig. 1, which, in turn, is pivotally connected to a link 73 disposed transversely of the frame member 38 and the slide-way or channel formed between frame members 44 and 45; the latter being provided with transversely disposed slots for the reception of the link 73 and the horizontally disposed roller 74 pivoted thereto. Link 73 is shown bent upwardly and backwardly at the end and has roller 74 secured to the underside of the upper, backwardly bent portion 30, so as to bring the roller 74 in a higher plane than the previously described rollers.

Slidably keyed to shaft 20, intermediate of the pinions 66 and 67, is a clutch member 75 adapted to be moved into clutching engagement with the interlocking surface 66$^a$ on the back of pinion 66. The clutch 75 is controlled by means of yoke 76, pivoted at 77 on the frame member 38; secured to said pivot, so as to cause yoke 76 to oscillate, is a lever 78; while the outer end of lever 78 is in turn pivotally connected to link 79 which extends transversely of the slide-way or channel formed by members 44 and 45, through suitable slot-ways therein. The link 79 is provided with a pair of horizontally disposed rollers or anti-friction engaging portions 80 and 81 spaced apart so as to be located on opposite sides of the channel or slide-way and permit controlling member or cam-rod 46 to pass therebetween when shifted either way. The outer end of link 79 is pivotally connected to a rocker arm 82 which is pivotally secured at 83 on the housing, while the opposite end of the rocker arm is pivotally connected to a link 84 extending transversely of the channel or slide-way and provided with a horizontally disposed roller 85 pivotally secured thereto. The link 84 is so formed that roller 85 will be in the same plane as roller 74, namely in a plane above the other rollers disposed in the slide-way.

Intermediate of pinion 67 and pinion 68 and slidably keyed to shaft 20 is a clutch member 86 controlled by a yoke 87 pivoted at 88 so as to be oscillated by a lever 89. The outer end of lever 89 is pivotally connected to a link 90, which is disposed transversely of the channel or slide-way and carries a pair of horizontally disposed, spaced rollers 91 and 92, located on opposite sides of the channel or slide-way, as shown in Fig. 1. The outer end of link 90 is pivotally connected to a rocker arm 93, pivoted at 94 on the housing of the transmission, while the other end of rocker arm 93 is pivotally connected to a link 95, extending transversely of the channel or slide-way and provided at its free end with a horizontally disposed roller 96. Through proper operation of clutch 86, the same is adapted to be moved into clutching engagement with the clutch surface 67ª on the back of pinion 67.

Slidably keyed to shaft 20, intermediate of pinion 68 and the shaft bearing 29, is a clutch 97 adapted to have clutching engagement with the clutch surface 68ª of pinion 68 when proper movement of clutch 97 is induced by operation of yoke or bifurcated member 98. which is pivotally secured at 99 so as to be controlled and oscillated by the lever 100. Lever 100, in turn, is pivotally connected to a link 101 which extends across shaft 20 and transversely of the channel or slide-way in which the operating member or cam-rod 46 reciprocates. The link 101, like the previously described links and members, is arranged in suitable slots or grooves provided in the frame members 44 and 45 adapted also to permit the passage of the rollers 102 and 103 which are pivotally secured to the link 101 in spaced relation and in a horizontal manner so as to be located on opposite sides of the channel or slide-way, and therefore in the paths of the respective cam surfaces on opposite sides of actuating member 46.

The bracket 65 provides suitable bearing for a stub-shaft 104, see Fig. 3; the upper end of the stub-shaft having bearing in the top-portion 105 of the transmission cover member. Keyed to stub-shaft 104 is a compound gear composed of spur gear 106 and a smaller spur gear 107. The gear 107 is arranged in mesh with a rack-bar 108, a portion whereof is shown in Fig. 1; the rack-bar extends lengthwise of the transmission housing, as shown in Fig. 2, with the outer end thereof secured to a suitable connecting link or rod. As shown at 109 in Fig. 2, the link 109 is intended to extend to a convenient point in the automobile or vehicle so as to enable the operator to manipulate the rack-bar 108 from a point on the steering wheel.

The large spur gear 106 meshes with a rack-bar 110 arranged on the opposite side of the compound gear; the bar 110 being riveted or otherwise secured to the composite operating member or actuating cam-rod 46, which is adapted to reciprocate or slide in the channel or slide-way between frame-members 44 and 45 previously referred to. The composite member 46 just referred to is composed of the cam-rod portion 46ª and cam-rod portion 46ᵇ shown secured beneath the rack-bar 110, as more clearly shown in Fig. 6.

It is evident from the construction shown and described that the reciprocatory movements of rack-bar 108, meshing with gear 107, will cause reciprocation of the composite operating member 46, but in an opposite direction and a greater speed, because movements of composite operating member 46 are imparted thereto through the medium of large gear 106, the ratio or rate of speed being determined by the ratio of the number of teeth on small gear 107 to the number of teeth on large gear 106. For example, in the specific exemplification shown in the drawings, the small spur gear 107 is provided with twelve teeth, while the large spur gear 106 is provided with twenty-six teeth, so that if rack-bar 108 is shifted a distance sufficient to cause spur gear 107 to make a complete revolution, spur gear 106 will also have been compelled to make a complete revolution and thereby cause composite operating member 46 to be shifted a distance slightly more than twice the distance traveled by rack-bar 108; in other words member 46 will have moved two and a sixth times the distance moved by bar 108.

As the composite operating member or rod 46 is shifted lengthwise of its slide-way or channel, it is evident that the cam surfaces thereof will be successively brought into engagement with the rollers or anti-friction surfaces of the various transversely disposed links of the different clutch mechanism of the transmission which are protruding into said channel or slide-way. The cam-rod 46ª is provided with cam surfaces 111 and 112, arranged at predetermined distances apart on the same side of the cam-rod and with cam surfaces 113 and 114 arranged at predetermined and greater distances apart on the opposite side of the cam-rod; the cam surfaces 111, 112, 113 and 114 being all disposed in the same horizontal plane. Cam surfaces 112 and 114 are arranged in advance of cam surfaces 111 and 113 relative to the direction of travel of the composite operating member 46.

The cam-rod 46ᵇ, which is arranged intermediate of cam-rod 46ᵃ and rack-bar 110, is shown provided with a single cam surface 115 arranged on the side presented toward rollers 74 and 85, and adjacent the end of the rod in advance of cam surface 112 during movement of rod 46 to the right in Fig. 1; cam surface 115 being located substantially opposite to cam surface 114 except, of course, that cam surface 115 is in a higher horizontal plane than the other cam surfaces.

The channel or slide-way for the composite operating member 46 is of a width just sufficient to permit the free reciprocation of said member; the cam surfaces preventing any lateral movement and assisting in maintaining the rack-bar portion of the composite member in mesh with the spur gear 106; the cam surfaces, together with the width of operating member, and the spacing of the rollers on each transversely disposed link, are such as will enable the cam-rods to pass intermediate of the pair of rollers or antifriction surfaces provided on the same link. It is understood, of course, that the respective rollers or anti-friction surfaces on the links are arranged in the same horizontal planes as the respective cam surfaces by which they are adapted to be engaged; and the cam surfaces are so disposed or related to one another as not to bring two cam surfaces into operative relation with the rollers of two different links whereby the clutch mechanisms of different pinions on the same shaft are operated at one and the same period or moment.

The transmission may be adapted to as many changes of speed as desired; as there may be any number of gear portions to the composite gear 22 and as many pinions as there are large gear portions; and the ratio between the respective portions of the large or composite gear and the pinions may be any ratio desired.

In the specific disclosure of the invention, the large or composite gear 22 is shown in the nature of three concentrically arranged bevel gears, with the largest gear portion 24 provided, for example, with ninety teeth; the intermediate gear portion 25 provided with sixty teeth, and the inner or smallest gear portion 26 provided with thirty teeth; while all of the pinions on the two shafts are each provided with twenty teeth.

The clutch mechanisms are so arranged that when one clutch on the power shaft 19 is interlocked with a pinion mounted on said shaft, but one clutch on shaft 20 will be interlocked with a pinion mounted on said driven shaft, and power transmitted from the power shaft 19 to the driven shaft 20 by means of the selective pinion and the selective portion of the large or composite gear 22.

The clutch-operating mechanism or composite cam-rod 46 is so formed and related to the respective clutch mechanisms, that clutch 75 on driven shaft 20 will be interlocked with pinion 66 until the first three ratios in the transmission illustrated have been passed through, after which clutch 75 is thrown out of engagement with pinion 66 while clutch 35 is left interlocked with pinion 32 on power shaft 19 until the fourth and fifth ratios of the transmission have been passed through and back again to the third ratio. In order to enable a clear comprehension of the operation of the transmission being obtained, the various speed changes or ratios will be followed through, whereby the different positions of the transmission mechanism are obtained, as disclosed in the diagrammatic views, Figs. 7 to 12, inclusive, where merely cam-rod portion 46ᵃ of composite member 46 is shown, for the purpose of clearness, with the exception of Fig. 12 where a part of cam-rod portion 46ᵇ is also shown.

The first ratio or speed of the transmission is obtainable with the mechanism in the position illustrated in Figs. 1 and 7. This position is obtained by proper reciprocation of rack-bar 108 so as to induce compound spur gear 106, 107 to be rotated in the desired direction whereby composite operating member 46 will be reciprocated in a direction which will cause cam surface 111 to be brought into striking engagement with roller 43 of link 41, causing the latter to move transversely of the slide-way, namely in a direction away from the power-shaft 19, and thereby rock the bell-crank lever formation 36, 40 whereby clutch 33 will be moved into clutching engagement with pinion 30, as disclosed in Figs. 1 and 7. This will cause power from shaft 19 to be transmitted through pinion 30 to the large gear portion 24 of the composite gear 22. In assembling the transmission, it is preferable to slide composite operating member 46 into its slide-way, from right to left (with the construction in the position shown in Fig. 1), so that the cam-surfaces will have caused the different clutch members on the driven shaft 20 to be moved into the positions shown in Fig. 1, the operating member 46 being moved to the place shown in said figure. With this position, to wit the cam surface 111 in contact with roller 43, as shown in Figs. 1 and 7, the clutch 75 will have been interlocked with pinion 66 on driven shaft 20; and as the composite operating member 46 is of a predetermined length there will be no cam surface located beyond or to the right of roller 85 of link 84. With the pinions 30 and 66 interlocked, or placed into operating relation with their respective shafts, it is evident that power will be transmitted by pinion 30 to large gear portion 24 and through large gear 26 to pinion 66, thereby securing what may be termed the first speed or ratio of approximately four and one-half to one and one-half.

The cam surfaces 111 and 113 (the latter located on the opposite side of the composite operating bar 46) are in such relation with each other, that cam surface 113 will be caused to engage with roller 42, (which has been moved into the slide-way through the shifting of link 41 as previously described) before cam surface 111 can be brought into contact with roller 52 (which is the first roller located in the slide-way and therefore in the path of cam surface 111) during the shifting of the transmission from one speed ratio to another; in other words a neutral position of the mechanism must be obtained and passed through before another speed ratio can be acquired. The further shifting of the composite actuating member 46, from left to right in Fig. 1, will bring cam surface 113 into striking engagement with roller 42 and cause link 41 to be shifted in a direction opposite to the direction of movement caused by cam surface 111, with the result that clutch mechanism 33 will be thrown out of clutching engagement with pinion 30. As no surface will as yet have been brought into operative engagement with a striking surface on the controlling link of clutch 75, the latter remains interlocked with pinion 66 on driven shaft 20. This position of the mechanism is a neutral position, as no pinion on the power shaft is locked thereto so that no power will be transmitted to the composite large gear 22, and therefore no power transmitted to driven shaft 20.

Further shifting movement of composite operating member 46, through proper movement of rock-bar 108, will bring cam surface 111 into striking engagement with the next roller disposed in its path, namely roller 52 mounted on link 50, which is connected with clutch mechanism 34. The action of cam surface 111 will cause clutch 34 to be moved into interlocking relation with pinion 31, locking it to power shaft 19 and therefore cause power to be transmitted from shaft 19, through pinion 31, to large gear portion 25 of composite gear 22.

The distance between cam-surface 112, on composite actuating member 46, and roller 81 on link 79 (the first roller to be disposed in the path of cam 112 under the conditions assumed) is such that cam surface 111 can be brought into engagement with roller 52 without bringing cam surface 112 into contact with the anti-friction striking surface of the link connected with the operating mechanism of clutch 75, so that pinion 66 still remains in interlocked relation with shaft 20 and is therefore transmitting power from large gear portion 26, of composite gear 22, to the driven shaft, as shown in the diagrammatic view, Fig. 8, at a second ratio of speed, or in the exemplification employed, a second ratio of three to one and one-half.

As previously stated, before another speed change can be obtained, the mechanism must pass through a neutral position. This is induced by cam surface 113 being brought into striking engagement with the anti-friction surface or roller 51, and which was brought into the path of cam surface 113 by the shifting of link 50 caused by cam surface 111, so that clutch 34 will be moved out of interlocking engagement with pinion 31 and further transmission of power from shaft 19 to large composite gear 22 prevented. Clutch 75 of pinion 66, however, still remains in interlocking engagement with pinion 66, because composite operating member 46 has not been advanced far enough to bring the cam-surface 112 into engagement with the striking surface or roller of the link of clutch 75.

Continued travel of composite member 46 from left to right, in Fig. 1 as heretofore described, is permissible because the striking surfaces or rollers 74 and 85 of links 73 and 84, respectively, are both arranged in a horizontal plane above cam-surfaces 111 and 112, so that the latter will be allowed to pass beneath the same without effecting any operation of links 73 and 84; the two last mentioned links being operated by the cam-surface 115 which is arranged in a horizontal plane above that occupied by cam-surfaces 111 and 112. Composite actuating member 46 may therefore continue its travel toward the right in Fig. 1 without affecting the positions of clutches 69 and 75.

With clutch surface 112 having preceded the arrival of clutch surfaces 111 and 113, the link 62 will be in the position shown in Fig. 1, and the striking surface or roller 63 will be disposed in the path of cam-surface 113, so that link 62 will be moved thereby and clutch 35 thrown into interlocking relation with pinion 32. This will cause power to be transmitted from power shaft 19 to the gear portion 26 of composite gear 22. The spacing of the anti-friction striking surfaces or rollers of the different clutch operating links and the spacing of the cam-surfaces on composite operating member 46 are such, that cam-surface 113 will be in striking engagement with anti-friction striking surface 63 of link 62 before cam-surface 112 is in striking relation with anti-friction striking surface 81 of link 79 of clutch 75, so that pinion 66 will still be in interlocking relation with driven shaft 20 at the same time that pinion 32 has been brought into interlocking relation with power shaft 19, so that power will be transmitted from power shaft to driven shaft,—by means of pinion 32, large gear portion 26, of composite gear 22, and pinion 66,—at a third speed, as shown in the diagrammatic view, Fig. 9, having a ratio of one and one-half to one and one-half in the particular exemplication chosen and hereinbefore employed.

Before passing to a fourth speed or ratio, the transmission mechanism will again be thrown into a neutral position induced by cam-surface 112 coming into striking engagement with roller 81 of link 79, (which is disposed in the path of cam-surface 112 as long as pinion 66 is locked to driven shaft 20, as is the case during all of the preceding ratios or speed changes) whereby clutch 75 is moved out of interlocking relation with pinion 66.

As clutch 35 was brought into interlocking relation with pinion 32 by cam-surface 113, it is evident that this relation will maintain because of the fact that cam-surface 113 has been moved beyond or to the right of roller 63, as disclosed in Fig. 1, and there is no cam-surface following to affect link 62 of clutch 35. While power is being transmitted from pinion 32 to composite large gear 22 in the position just described, no power is transmitted to the driven shaft 20 because none of the pinions mounted thereon have been moved into operative engagement therewith.

Composite operating member 46 being shifted farther to the right will cause cam-surface 114 to be brought into striking relation with anti-friction surface or roller 91 on link 90, (the first roller disposed in the path of cam-surface 114) causing the latter to be shifted transversely of the slideway so as to throw clutch 87 into interlocking relation with pinion 67 and place the latter into operative relation with driven shaft 20. With this positioning of the mechanism, (which is illustrated in diagrammatic view, Fig. 10) power will be transmitted from power shaft 19 to driven shaft 20, by means of pinion 32, large gear portion 26 of composite gear 22, large gear portion 25 and pinion 67; so that a fourth speed has now been obtained having a ratio of one and one-half to three in the particular exemplication employed.

To pass from this fourth speed or ratio forward to a fifth speed or ratio, again requires the mechanism to be placed in a neutral position by reason of the construction disclosed.

Clutch 86 having been operated or moved into clutching engagement, by means of cam-surface 114, has caused anti-friction striking surface or roller 92 on link 90 to be brought into the path of cam-surface 112, which follows cam-surface 114 relative to the direction of travel of operating element or composite member 46.

By continuing to shift actuating mechanism 46 to the right in Fig. 1, cam-surface 112 will be brought into striking engagement with roller 103 (which is disposed in the path of the cam-surface 112 whenever clutch 97 is out of mesh) on link 101 and cause the latter to be shifted transversely of the slideway so as to move clutch 97 into clutching engagement with pinion 68 and thereby cause operative relation between the latter and the driven shaft 20. During such shifting of clutch 97 no actuation or operation of clutch 35 has been had, so that the latter still remains in interlocked relation with pinion 32, causing power to be transmitted from power shaft 19 through pinion 32 to large gear portion 26 of composite gear 22 and through large gear portion 24 of composite gear 22 to pinion 68 on driven shaft 20, (as shown in diagrammatic view, Fig. 11) thereby obtaining a fifth change of speed at a ratio of one and one-half to four and one-half.

The exemplification of the invention as illustrated in the drawings provides for five speeds forward, but it is readily apparent that the number of speeds or ratios may be varied by a variation in the number of intermeshing gears and pinions.

It is evident from the construction shown that the effect of the composite operating member 46 on the respective links of the various clutch mechanisms is the reverse from that described when it is desired to pass from the fifth ratio or speed back to the first ratio or speed, because the shifting of the different links by the cam-surface or surfaces on one longitudinal side of operating member 46 causes a second roller on each link to be brought into the path of the cam-surface or surfaces on the opposite side of member 46; and in certain instances has caused a third roller having operative relation with certain links, to be brought into the path of the first mentioned cam-surface or surfaces but beyond the immediate operating path thereof.

In order to accomplish a reverse transmission, the actuating composite member 46 will have to be moved or reciprocated back toward the left hand end of the channel or slideway illustrated in Fig. 1, through proper operation of rack-bar 108. It is evident from the construction shown that a comparatively small degree of movement of rack-bar 108 will induce more than twice the amount of movement or reciprocation of composite operating member 46, so that but little movement of the operating lever is required to effect such operation of the transmission mechanism as will result in obtaining all the speed ratios hereinbefore described and in passing through the same from fifth to first ratio and to reverse.

In actuating the mechanism so as to obtain the fifth speed or ratio, caused by the interlocking of clutch 97 with pinion 68, it was necessary to bring composite operating member 46 to the right hand end of the channel or slideway in Fig. 1, as shown in Fig. 11, with cam-surface 112 in contact with roller 103, as shown in Fig. 11. With the mechanism in this position, cam-surface 114 has passed beyond link 101, see Fig. 11, while roller 102 has been brought into the path of cam-surface 114, so that upon the return of member 46 toward the left hand end of the channel or slide-way, cam-surface 114 will be forced into engagement with roller 102 and cause link 101 to be so shifted as to force clutch 97 out of interlocking engagement with pinion 68, thereby obtaining a neutral position, although pinion 32 on power-shaft 19 is still in operative relation with the power shaft and transmitting motion to large composite gear 22. Power, however, will not be transmitted to the driven shaft because none of the pinions thereon are at that moment in operative relation therewith.

Continued reciprocation of member 46 to the left will cause cam-surface 114 to come into striking relation with roller 91, which protrudes into the channel when the clutch 86 of pinion 67 is in neutral position, which position has been obtained by cam-surface 112 striking roller 92 on the same link as roller 91. The result of cam-surface 114 striking roller 91 will cause clutch 86 to move into interlocking relation with pinion 67 and thereby effect a return to the fourth ratio or change of speed previously described, namely with pinion 67 meshing with large gear portion 25 and pinion 32 meshing with large gear portion 26 of composite gear 22.

As cam-surface 114 is the last cam-surface on member 46, when considering movement of member 46 from right to left, it is apparent that a third striking or engaging surface must be provided beyond rollers 91 and 92 relative to the movement from right to left, whereby clutch 86 can be thrown out of interlocking position. For that reason, I have provided link 95 arranged intermediate of link 90, and link 79 of clutch 75, and connected with link 90 by means of rocker-bar 93, whereby movement of link 90 will cause bar 93 to rock on its pivot and induce link 95 to move in a direction opposite to that of link 90.

Further movement of composite member 46 to the left therefore will cause it to bring cam-surface 114 into striking engagement with roller 96, which was forced into the path of the cam-surface through the action of the latter on roller 91. Cam-surface 114 engaging roller 96 will cause the latter to move out of the path of the cam-surface, thereby tilting rocker-bar 93 so as to draw link 90 in the opposite direction, namely into the position illustrated in Fig. 1, that is, with clutch 86 out of interlocking relation with pinion 67, with the result that we have again brought the transmission mechanism into a neutral position, without, however, affecting the interlocking relation between clutch 35 and pinion 32, because such interlocking relation is effected or obtained by cam-surface 113 at the left hand end of the composite operating member 46, which has previously forced roller 63 out of its path while member 46 was shifting toward the right in Fig. 1.

During the reciprocation of composite cam-member 46 to the left in Fig. 1, cam-surface 112 forced roller 81 out of its path and thereby caused roller 80, on the same link, to come into the path of cam-surface 114. This action of cam 112 on roller 81 also throws clutch 75 out of interlocking relation with pinion 66. Continued movement to the left therefore, of composite cam member 46, will cause cam-surface 114 to strike roller 80 and move it into the position shown in Fig. 1, whereby clutch 75 is placed into interlocking relation with pinion 66. At this stage of the operation, we have pinions 32 and 66 interlocked with shafts 19 and 20, respectively, namely at the speed ratio shown in Fig. 9.

Further reciprocation to the left of composite cam member 46 will cause cam-surface 112 to engage with roller 64 (which was brought into the slide-way through action of cam 113 on roller 63), so as to cause link 62 to throw clutch 35 out of interlocking relation with pinion 32. At the same time, cam 111 will have been brought into striking relation with roller 43 so as to cause link 41 to throw clutch 33 into interlocking relation with pinion 30 on power shaft 19; in other words, the transmission has been moved back to what has been termed the first ratio or speed.

By moving actuating member 46 to a slight degree farther to the left in Fig. 1, leaves clutch 33 in interlocking relation with pinion 30, but causes cam-surface 115 (which is in a higher horizontal plane than cam-surface 112) to engage with roller 74 (also arranged in a higher horizontal plane than the other rollers heretofore referred to except roller 85) on link 73. Cam-surface 115 will shift link 73 in a direction which will cause clutch 69, slidably keyed on driven shaft 20 to be moved into interlocking relation with the extended hub-portion of pinion 32 (as shown in diagrammatic view, in Fig. 12), so that power will be transmitted to the driven shaft by means of pinion 32 on the power shaft; in other words, the transmission mechanism has thereby been moved to reverse position, as power will be transmitted from power shaft 19, through pinion 30 to large gear portion 24 of composite gear 22, and by means of large gear portion 26, of composite gear 22, to pinion 32, so that driven shaft 20 will be rotating in the same direction as power shaft 19. Although clutch 75 in the movement of actuating member 46 to the left was thrown into interlocking relation with pinion 66, it is evident that reverse rotation of shaft 20 will cause clutch 75, by reason of the formation of the interlocking surfaces, to unratchet itself from and be moved out of engagement with pinion 66.

It is evident some means must be provided to enable a return from "reverse" to the first ratio or speed; in other words with clutch 75 having unratcheted itself from pinion 66, actuating mechanism must be provided to throw clutch 75 into mesh with pinion 66 before cam-face 113 has been moved into striking engagement with roller 42 of link 41 whereby clutch 33 is controlled.

For that reason, I provide rocker-bar 82 connected with link 79 and link 84, which latter is arranged in close proximity to link 73 whereby the "reverse" position was obtained; and as the unratcheting of clutch 75 only obtains in moving into "reverse" the roller 85 is arranged in the same plane as roller 74, above that of all the other rollers. Roller 85 therefore will be engaged by cam-surface 115, as soon as member 46 is shifted again toward the right, thereby causing roller 85 (which was moved into the path of cam-surface 115 through the unratcheting movement of clutch 75 and its operating links) to be forced out of its path, causing rocker-arm 82 to move link 79 in opposite direction, which forces clutch 75 into engagement with pinion 66, bringing roller 81 into the slide-way. With clutch 33 in mesh with pinion 30, power is transmitted again through large gear portion 24, large gear portion 26 and pinion 66 to driven-shaft 20, causing the latter to rotate in reverse direction from shaft 19 and thereby induce clutch 69 to automatically unratchet itself from pinion 32.

As is apparent from the construction shown and described, the various speed changes or ratios are all obtained without the necessity of shifting any intermeshing gears, so that danger of "stripping" gears is entirely eliminated; while all speed changes, forward and reverse, are obtained through the operation of a single member or lever connected with rack-bar 108; and the speed changes obtained by very little movement of the lever owing to the employment of a compound gear between the rack-bar and composite cam-rod.

As has been described in the specification, in passing from one speed change to another, the cam-surfaces and anti-friction striking surfaces or rollers are so correlated to one another as to make it impossible to throw more than one clutch on the same shaft into engagement at a time, (except in the case of the clutch for "reverse"), so that the possibility of "locking" the transmission or "stalling" the motor is entirely eliminated; the construction requiring a neutral position being obtained between each speed change.

It will be understood, of course, that any speed reduction required from the engine or motor to the power or driving shaft of the transmission may be had through suitable sized pinions and gears; the transmission mechanism shown and described permitting the engine or motor to be run at the most efficient speed; while the speed of the vehicle is controlled by the motive power transmitted thereto through the transmission.

With the construction shown and described, all of the intermeshing and contacting moving elements of the transmission can be immersed or run in oil, as the housing may be filled with oil up to the center line of the shafts. The construction shown and described also permits ready access to be had to all of the parts through the removal of a single member or cover plate.

The inventive idea involved is capable of receiving a variety of mechanical expressions, but the one which I believe to be the simplest and best embodiment of the invention is shown and described; modifications may be made, however, without departing from the spirit of my invention; it being also apparent that the invention may be adapted to uses other than in connection with automobiles.

What I claim is:—

1. Transmission mechanism of the class described, comprising, in combination with a power shaft and a driven shaft, a series of concentric gears, a plurality of pinions intermediate of both shafts and said gears whereby power is transmitted from the power shaft to said concentric gears at different speeds and from the latter to a portion of said pinions, means whereby the desired pinions and the shafts are brought into operative relation with each other and power transmitted from the power shaft, at the predetermined speed, through said pinions and the desired gears, to the driven shaft, and an operating member common to all of said means.

2. Transmission mechanism of the class described, comprising, in combination with a power shaft and a driven shaft, a series of concentric gears adapted to rotate about an axis disposed perpendicular to the axes of said shafts, a plurality of pinions loosely mounted on said shafts and in mesh with both gears, the pinions on the power and driven shafts being located on opposite sides of the axis of the concentric gears, means whereby the desired pinions and the shafts are brought into operative relation with one another and power transmitted, from the power shaft through said pinions and the desired gears, to the driven shaft, and an operating member common to all of said means.

3. Transmission mechanism of the class described, comprising, in combination with a power shaft and a driven shaft, a series of concentric gears, a plurality of pinions intermediate of the shafts and said gears, means whereby the respective pinions and the shafts are brought into operative relation with one another, and means common to all of said first mentioned means whereby prearranged portions of said first mentioned means are controlled at predetermined intervals.

4. Transmission mechanism of the class described, comprising, in combination with a power shaft and a driven shaft, a series of concentric gears adapted to rotate about an axis disposed perpendicular to the axes of said shafts, a plurality of pinions loosely mounted on said shafts and meshing with said gears, a plurality of mechanisms for separately controlling each pinion and inducing operative relation between the pinions and their respective shafts, and means common to all of said mechanisms whereby predetermined numbers of said mechanisms are actuated at predetermined intervals in the operation of said means and power transmitted from the power shaft through the desired pinions and gears to the driven shaft.

5. Transmission mechanism of the class described, comprising, in combination with a power shaft and a driven shaft, concentrically arranged circumferential gears disposed parallel with the shafts, a plurality of pinions loosely mounted on both shafts and constantly in mesh with said gears whereby power is transmitted from the power shaft to said concentric gears at different speeds and from the latter to a portion of said pinions, and means common to all of the pinions whereby they are controlled and predetermined pinions placed into operative relation with their respective shafts and power transmitted from the power shaft through the desired gears and pinions to the driven shaft at a predetermined speed.

6. Transmission mechanism of the class described, comprising, in combination with a power shaft and a driven shaft, concentrically arranged circumferential gears adapted to rotate together, a plurality of pinions loosely mounted on both shafts and constantly in mesh with said concentric gears, interlocking mechanisms for all of said pinions whereby the latter may be placed into operative relation with their respective shafts, and means whereby a predetermined number of said mechanisms are affected at prearranged intervals and the desired pinions and gears caused to transmit power from the power shaft to the driven shaft at a predetermined speed.

7. Transmission mechanism of the class described, comprising, in combination with a power shaft and a driven shaft, a series of concentrically arranged circumferential gears, a plurality of pinions intermediate of said gears and both of said shafts and arranged in constant mesh with said gears, controlling mechanism for each pinion whereby the latter may be placed into operative relation with the respective shaft, and means common to all of said mechanisms whereby predetermined movements of said means will progressively actuate said mechanisms and cause power to be transmitted at predetermined speeds.

8. Transmission mechanism of the class described, comprising, in combination with a power shaft and a driven shaft disposed in alined relation with each other, a series of concentrically arranged circumferential gears disposed parallel with the shafts, a plurality of pinions loosely mounted on both shafts and in constant mesh with said gears, a plurality of clutch mechanisms slidably keyed to said shafts and adapted to cause interlocking relation between the pinions and said shafts, an actuating member common to all of said clutch mechanisms, and means connected with said clutch mechanisms and disposed in the path of said actuating member and correlated therewith so that the clutch mechanisms are progressively actuated and power transmitted to the driven shaft, through prearranged gears and pinions, at predetermined speeds.

9. Transmission mechanism of the class described, comprising, in combination with a power shaft and a driven shaft, movement transmitting means intermediate of said shafts, a portion of said means being normally out of operative relation with the shafts, and a plurality of mechanisms having operative relation with different parts of the last mentioned portion of said means whereby various parts of said means are successively caused to transmit power to the driven shaft at predetermined speeds.

10. Transmission mechanism of the class described, comprising, in combination with a power shaft and a driven shaft arranged in alined relation, a series of concentrically arranged circumferential gears disposed parallel with the shafts, a plurality of pinions loosely mounted on both shafts and in constant mesh with said gears, a plurality of clutch mechanisms keyed to said shafts intermediate of said pinions whereby the latter are brought into operative relation with their respective shafts, a single reciprocatingly mounted actuating member, means intermediate of the clutch mechanisms and said actuating member whereby predetermined movements of the latter will cause certain of the clutch mechanisms to move into clutching engagement with their respective pinions and thereby transmit power to the driven shaft at a predetermined speed.

11. Transmission mechanism of the class described, comprising, in combination with a power shaft and a driven shaft, a series of concentric circumferential gears, a plurality of pinions loosely mounted on both shafts and in constant mesh with said gears, means whereby the pinions are progressively brought into operative relation with the shafts, and means whereby said last mentioned means are controlled and prearranged portions thereof affected at predetermined intervals.

12. Transmission mechanism of the class described, comprising, in combination with a power shaft and a driven shaft, a series of concentrically arranged circumferential gears disposed parallel with the shafts, a plurality of pinions loosely mounted on said shafts and in constant mesh with said gears, clutch mechanisms slidably keyed to the shafts for inducing operative relation between the pinions and said shafts, actuating members operatively connected with said clutch mechanisms, a member common to all of said last mentioned members, adapted to operate prearranged numbers of said members at different intervals in its movement, and means whereby said last mentioned member is controlled and actuated at a predetermined speed.

13. Transmission mechanism of the class described, comprising, in combination with a power shaft and a driven shaft arranged in alined relation, a series of concentrically arranged circumferential gears disposed parallel with the shafts, a plurality of pinions loosely mounted on both shafts and in constant mesh with said gears, a plurality of clutch members slidably keyed on said shafts and adapted to effect operative relation between the pinions and their respective shafts, actuating elements for all of said clutch members and disposed in the same direction, and a controlling member adapted to be moved across the path of said actuating elements, said elements and member being provided with correlated surfaces arranged to come into striking relation with each other at predetermined intervals in the movement of said member whereby certain pinions with their intermeshing gears are made to transmit power to the driven shaft at predetermined speeds.

14. Transmission mechanism of the class described, comprising, in combination with a power shaft and a driven shaft disposed in alined relation, a series of concentrically arranged circumferential gears disposed parallel with the shafts, a plurality of loosely mounted pinions on both shafts in constant mesh with said gears, a clutch member for each pinion for effecting operative relation between the pinions and their respective shafts, controlling mechanism for each clutch member, all of said controlling mechanisms being disposed in the same direction and each provided with engaging surfaces, and an actuating element mounted to slide transversely of said controlling mechanisms, provided with operating surfaces at predetermined intervals apart, adapted to progressively come into contact with the engaging surfaces of the controlling mechanisms during predetermined movements of said actuating element, whereby power will be transmitted to the driven shaft at predetermined speeds.

15. Transmission mechanism of the class described, comprising, in combination with a power shaft and a driven shaft, both disposed in alined relation, a series of concentrically arranged circumferential gears disposed parallel with the shafts and in proximity with the adjacent ends thereof, a plurality of pinions loosely mounted on both shafts and arranged in constant mesh with said gears, a plurality of clutch members slidably keyed to both shafts and adapted to cause interlocking relation between the pinions and their respective shafts, means connected with said clutch members and provided with a plurality of engaging surfaces, an actuating member common to all of said means and provided with engaging surfaces at prearranged intervals adapted to be progressively brought into operative relation with the engaging surfaces of said means, the engaging surfaces of said means and of said actuating member being so arranged that prearranged clutch members will be actuated with predetermined positionings of said actuating member, and means whereby said actuating member is controlled.

16. Transmission mechanism of the class described, comprising, in combination with a power shaft and a driven shaft, arranged in alined relation with each other, concentrically arranged circumferential gears disposed parallel with both shafts and in proximity thereto, a plurality of pinions loosely mounted on both shafts and arranged in constant mesh with said gears, a clutch member for each pinion whereby operative relation between the pinions and their respective shafts may be provided, controlling mechanism for each clutch member, all of said controlling mechanisms being disposed in the same direction, an actuating member common to all of said controlling mechanisms, said actuating member and controlling mechanisms being provided with correlated surfaces whereby prearranged clutch members are operated upon predetermined degrees of movement of said actuating member, and means whereby said actuating member is controlled.

17. Transmission mechanism of the class described, comprising, in combination with a power shaft and a driven shaft, arranged in alined relation, a series of concentric circumferential gears arranged parallel with both shafts, a plurality of pinions loosely mounted on both shafts and in constant mesh with said gears, a clutch member for each pinion whereby operative relation between the pinions and their respective shafts may be effected, and means common to all of said clutch members and correlated thereto so as to actuate but one clutch member on a shaft at the same moment of operation.

18. Transmission mechanism of the class described, comprising, in combination with a power shaft and a driven shaft arranged in alined relation, a series of concentrically arranged circumferential gears disposed parallel with and in close proximity to both shafts, a plurality of pinions loosely mounted on both shafts and in constant mesh with said gears, a clutch member for each pinion for effecting operative relation between the pinions and their respective shafts, a slide-way disposed parallel with said shafts, slidably mounted members for controlling said clutch members, all of said slidably mounted members being disposed transversely of said slide-way and provided with a plurality of engaging surfaces, an element slidably mounted in said slideway and provided with engaging surfaces disposed at prearranged intervals throughout its length, certain portions of said surfaces being adapted to simultaneously engage with a prearranged number of the engaging surfaces of said slidably mounted members whereby predetermined pinions are placed into operative relation with the shafts, means whereby said element is controlled, and a rack and pinion connection intermediate of said last mentioned means and said element whereby the latter may be given predetermined degrees of movement.

19. Transmission mechanism of the class described, comprising in combination with a power shaft and a driven shaft, a series of concentrically arranged circumferential gears disposed parallel with said shafts, a plurality of pinions loosely mounted on both shafts and in constant mesh with said gears, a plurality of clutch mechanisms for effecting operative relation between the pinions and their respective shafts, a clutch member intermediate of the pinion on one shaft and the end of the adjacent shaft whereby power may be transmitted from one shaft to the other without transmitting the same through the pinions of the driven shaft, and means common to all of said clutch mechanisms and said clutch member whereby a certain number thereof are progressively actuated upon predetermined degrees of movement of said means.

20. Transmission mechanism of the class described, comprising, in combination with a power shaft and a driven shaft, a series of concentrically arranged circumferential gears arranged parallel with said shafts, a plurality of pinions loosely mounted on said shafts and in constant mesh with said gears, means whereby predetermined pinions on both shafts are progressively brought into operative relation and power transmitted from the power shaft through the desired pinions and their intermeshing gears to the driven shaft, and means intermediate of the adjacent ends of the shafts whereby power may be transmitted from the power shaft to the driven shaft without transmitting the same through the pinions on one of said shafts.

21. Transmission mechanism of the class described, comprising, in combination with a power shaft and a driven shaft, a series of concentrically arranged circumferential gears arranged parallel with said shafts, a plurality of pinions loosely mounted on said shafts and in constant mesh with said gears, a clutch member for each pinion whereby operative relation between the pinions and their respective shafts may be effected, a lever mechanism for each clutch member, the free ends of said lever mechanisms being all disposed in the same direction and provided with a plurality of contacting surfaces, and a slidably mounted actuating member common to all of said lever mechanisms, said actuating member being provided with actuating surfaces arranged at predetermined intervals apart and adapted to engage with a prearranged number of engaging surfaces on said lever mechanisms during predetermined degrees of movement of said member whereby power will be transmitted to the driven shaft through the prearranged pinions and gears.

22. Transmission mechanism of the class described, comprising, in combination with a power shaft and a driven shaft, a series of concentrically arranged circumferential gears disposed parallel with the shafts, a plurality of pinions loosely mounted on both shafts and in constant mesh with said gears, clutch mechanisms whereby said pinions may be placed in operative relation with their respective shafts, an actuating lever for each clutch mechanism, all of said levers being disposed in the same direction and each provided with a plurality of engaging surfaces arranged in spaced relation, and a controlling member common to all of said levers and adapted to move transversely of the ends of said levers in a plane intermediate of said engaging surfaces, said controlling member being provided with protruding surfaces arranged at predetermined intervals apart and adapted to successively engage with the engaging surfaces on said levers, whereby prearranged pinions will be brought into operative relation with their respective shafts during predetermined degrees of movement of said controlling member.

23. Transmission mechanism of the class described, comprising, in combination with a power shaft and a driven shaft, a series of concentrically arranged circumferential gears disposed parallel with their shafts, a plurality of pinions loosely mounted on said shafts and in constant mesh with the adjacently arranged gear of said series of gears, a clutch element for each pinion whereby operative relation between the pinions and their respective shafts may be effected, a clutch element intermediate of the ends of both shafts, separate operating mechanisms for each clutch element, all of said operating mechanisms being disposed in the same direction and provided with a plurality of engaging surfaces arranged in spaced relation, an actuating member arranged to slide transversely of said operating mechanisms in a plane intermediate of the respective engaging surfaces on said operating mechanisms, said actuating member being provided with protruding surfaces at prearranged intervals apart adapted to successively engage with said engaging surfaces, and means whereby said actuating member may be given predetermined movement and the desired clutch elements operated so that power will be transmitted to the driven shaft in a predetermined manner and at the desired speed.

24. Transmission mechanism of the class described, comprising, in combination with a power shaft and a driven shaft, a series of concentrically arranged circumferential gears disposed parallel with said shafts, a plurality of pinions loosely mounted on said shafts and in constant mesh with the adjacent gear of said circumferential gears, a clutch element for each pinion whereby operative relation between the pinions and their respective shafts may be effected, controlling mechanism for each of said clutch elements, all of said controlling mechanisms being disposed in the same direction and arranged in spaced relation, and an actuating member common to all of said controlling mechanisms and provided with actuating surfaces arranged at predetermined intervals apart so as to engage with successive controlling mechanisms during predetermined movements of said member and provide a neutral position intermediate of the periods of actuation of the successive mechanisms.

25. Transmission mechanism of the class described, comprising, in combination with a power shaft and a driven shaft arranged in alined relation, a circumferential gear disposed parallel with said shafts, pinions loosely mounted on said shafts and arranged in mesh with said gear, clutch mechanism for each pinion whereby operative relation between the pinions and shafts may be effected, a clutch element intermediate of the shafts whereby operative relation between the shafts may be effected, and means, common to the clutch mechanisms and element whereby portions of said mechanisms or said element are actuated at predetermined moments in the operation of said means.

26. Transmission mechanism of the class described, comprising a housing adapted to receive the ends of a power shaft and a driven shaft and provide bearings therefor so as to maintain them in alined relation, said housing being provided with a trunnion disposed in a direction perpendicular to said shafts, a circumferential gear mounted on said trunnion, pinions loosely mounted on both shafts and adapted to mesh with said gear, clutch members slidably keyed to said shafts, whereby operative relation between the pinions and shafts may be effected, and means adapted to control certain clutch-members at predetermined moments in the operation of said means.

27. Transmission mechanism of the class described, comprising, in combination with a power shaft and a driven shaft, a housing adapted to receive the ends of said shafts and provide bearings therefor so as to maintain them in alined relation, said housing being formed to hold a lubricant so that the respective operating parts may be immersed therein, a trunnion arranged in said housing and disposed in a direction perpendicular to said shafts, a circumferential gear mounted on said trunnion and adapted to rotate, pinions loosely mounted on both shafts and adapted to mesh with said gear, clutch members slidably keyed to said shafts whereby operative relation between the pinions and shafts may be effected, and means provided with actuating surfaces disposed at predetermined intervals apart and arranged to successively control certain clutch members at predetermined moments in the operation of said means.

IRVIN HUPP.

Witnesses:
George Heidman,
F. A. Florell.